United States Patent
Beyda et al.

(10) Patent No.: US 6,470,358 B1
(45) Date of Patent: Oct. 22, 2002

(54) REMOTE SYNCHRONIZATION WITH INTELLIGENT POWER MANAGEMENT

(75) Inventors: William Joseph Beyda, Cupertino; Shmuel Shaffer, Palo Alto, both of CA (US)

(73) Assignee: Siemens Information and Communication Networks, Inc., Boca Raton, FL (US)

( * ) Notice: Subject to any disclaimer, the term of this patent is extended or adjusted under 35 U.S.C. 154(b) by 0 days.

(21) Appl. No.: 09/235,571

(22) Filed: Jan. 22, 1999

(51) Int. Cl.[7] ............................................. G06F 12/00
(52) U.S. Cl. ...................................................... 707/201
(58) Field of Search ........................... 707/201; 713/340

(56) References Cited

U.S. PATENT DOCUMENTS

| | | | | |
|---|---|---|---|---|
| 5,303,171 A | * | 4/1994 | Belt et al. ...................... 713/321 |
| 5,423,045 A | * | 6/1995 | Kannan et al. ............... 713/322 |
| 5,758,355 A | * | 5/1998 | Buchanan .................... 707/201 |
| 5,841,844 A | * | 11/1998 | Park ........................ 379/100.14 |
| 5,845,142 A | * | 12/1998 | Hayasaka .................... 713/340 |
| 5,926,404 A | * | 7/1999 | Zeller et al. ................. 713/321 |
| 5,928,329 A | * | 7/1999 | Clark et al. ................... 709/227 |
| 6,006,274 A | * | 12/1999 | Hawkins et al. ............. 707/201 |
| 6,023,708 A | * | 2/2000 | Mendez et al. .............. 707/203 |
| 6,044,381 A | * | 3/2000 | Boothby et al. ............. 707/201 |
| 6,092,083 A | * | 7/2000 | Brodersen et al. .......... 707/201 |

OTHER PUBLICATIONS

Selected Help Screens re: My Briefcase, Microsoft Office 95, Microsoft Corp.
Selected Help Screens re: Mail Synchronization, Microsoft Outlook 98, Microsoft Corp.

* cited by examiner

Primary Examiner—Paul R. Myers

(57) ABSTRACT

Synchronization techniques that improve the ease with which synchronization operations can be performed are disclosed. Synchronization is performed between resources on a portable computing device and resources stored on a remote server. The synchronization can be centralized across different types so that user interaction to achieve the different types of synchronization is minimal. Battery power can also be conserved during synchronization. A user can also be informed as to when the portable computing device should be shut-down or placed in a low-power state to have sufficient battery power remaining to perform the synchronization. The synchronization operations can be easily activated without much user interaction.

36 Claims, 5 Drawing Sheets

REMOTE SYNCHRONIZATION WITH INTELLIGENT POWER MANAGEMENT

BACKGROUND OF THE INVENTION

1. Field of the Invention

The present invention relates to portable computing devices and, more particularly, to a method and apparatus for synchronization of a portable computer with a desktop computer or a remote server.

2. Description of the Related Art

Today there are many types of portable computing devices that operate various applications that use files which are permanently resident on a main computer, such as a desktop computer or file server. The portable computing device thus often stores a copy of one or more of the files that are permanently resident on the main computer. Synchronization is then the task of making the copies of the files at the different locations the same. Usually, this means that the most up to date version of the files are used to copy over the older versions.

For example, a common situation in where a user has a desktop computer at a business office but uses a portable computer when working away from the business office. Typically, the desktop computer, or a file server networked thereto, is the permanent storage location for files used by the user. However, often the user copies files from the desktop computer (or file server) to the portable computer so that the user can work on using these files while away from the business office. When the user does work away from the business office using these files with the portable computer, these files are often updated or changed. When this happens, the copy of the files on the portable computer becomes the correct version and the copies on the desktop computer (or file server) are outdated. Hence, in such a situation, a synchronization operation is performed when the portable computer is next connected to the desktop computer. In such case, the copies of the files on the desktop computer (or file server) are synchronized with the copies on the portable computer which, in this example, are more current. Similarly, when new files are created on the portable computer, such newly created files would also be copied over to the desktop computer (or file server) during synchronization.

Often, synchronization is performed be remotely accessing a network having the desktop computer or server coupled thereto. With today's portable computers, remote access synchronization software requires a portable computer to be open and powered-up to perform the remote access synchronization software. The remote access synchronization software also requires that the portable computer be connected to the main computer. This connection is often provided by a telephone line connection from the portable computer to a local network that couples to the main computer. Still further, various user selections and navigations are required with a user interface for the remote access software.

It is also common for portable computers to require multiple types of synchronization. For example, two commonly performed separate synchronizations for a portable computer are (i) synchronization with an email server and (ii) synchronization with a file server. These different synchronizations are processed separately and use different user interactions to provide the different types of synchronization. For example, it is typical that a synchronization operation needs to be performed for files, and that a separate synchronization operation needs to be performed for email and calendar updating. It is often problematic for a user of the portable computer to effectuate the synchronization operations due to the significant amount of user interaction as well as time required with each the synchronization programs to cause the synchronizations to occur.

Also, during the synchronizations, the portable computer needs to be coupled to a telephone line which makes it inconvenient to utilize the portable computer in many cases. For example, if a user of a portable computer is connecting to a telephone line by using a pay telephone, then the user often has difficulties in resting the portable computer in a convenient position that permits not only connection to the telephone but also viewing the screen and user interaction with the keyboard and pointing device. These inconveniences further complicate the synchronization operations for the user.

In Microsoft Windows 95™, a "Briefcase" feature is provided as a mechanism for automatically copying files that have changed from a portable computer back to a desktop computer. To use the Briefcase, you drag files from a shared folder on your main computer to the Briefcase folder (icon) on the portable computer, at this point the two computers need to be connected by a wire or by a network. Later, when finished working on your portable computer, reconnect to the main computer, and select "Update All" in the Briefcase to automatically replace the unmodified files on the main computer with the modified files in your Briefcase. Also, Microsoft Outlook 98™ provides remote access synchronization to update email (e.g., update mailboxes) and calendar entries.

In order to perform these synchronizations, the portable computing device needs to be operative. That is, the battery of the portable computing device needs to have sufficient charge remaining to power-up the portable computing device, connect the portable with a main computer, run the synchronization modules, and interact with the user via keyboard, screen and pointing device. Hence, during synchronization significant amounts of power are needed and consumed, and thus the operation of portable computing devices are not power efficient during synchronizations. Often users of portable computing devices are without an AC power source and operate on battery power. These users often consume nearly all the available battery power before shutting down the portable computer. If this happens, there is typically not enough battery power to perform all the needed synchronizations with a main computer. In such cases, synchronization cannot occur until a replacement battery is obtained or a AC power source is available.

Thus, there is a need for improved synchronization techniques that improve the ease with which synchronization operations are performed.

SUMMARY OF THE INVENTION

Broadly speaking, the invention relates to improved synchronization techniques that improve the ease with which synchronization operations are performed. Synchronization is performed between resources on a portable computing device and resources stored on a remote server. There are several aspects of the invention and embodiments of the invention can use one or more of these aspects to provide improved synchronization. One aspect of the invention pertains to providing centralized synchronization across different types so that user interaction to achieve the different types of synchronization is minimal. Another aspect of the invention pertains to conservation of battery power during synchronization. Still another aspect of the invention pertains to informing a user of the portable computing device that shut-down or low-power state should be entered within a predetermined period of time to have sufficient battery power remaining to perform the synchronization. Yet another aspect of the invention is the ability to automatically activate the synchronization processing upon detecting of the connection to a telephone line.

The invention can be implemented in numerous ways, including as a method, an apparatus, a computer readable medium, and a computer system. Several embodiments of the invention are discussed below.

As a method for synchronizing resources between a portable computing device and a remote synchronization server, one embodiment of the invention includes the operations of centrally tracking synchronization events on the portable computing device; determining whether synchronization is to be performed; and when the determining indicates that synchronization is to be performed, then sending synchronization information pertaining to the synchronization events tracked to the remote synchronization server, and distributing the synchronization information to appropriate destinations where synchronization operations are separately performed.

As a system for synchronization of a portable computing device with remotely located resources, one embodiment of the invention includes: local resources stored on the portable computing device; a synchronization client on the portable computing device that logs changes to the local resources; a remote destination server that stores remote resources, at least a portion of the local resources being copies of the remote resources; and a synchronization server that communicates with the synchronization client to synchronize those of the remote resources that correspond to the local resources that have been logged as being changed by the synchronization client.

As a method for notifying a user of a portable computing device that shut-down or low-power operation should occur to permit synchronization of the portable computing device with remote resources, one embodiment of the invention includes: determining an estimated battery life for a battery of the portable computing device when continuing to power the portable computing device from the battery; determining an estimated synchronization time for synchronization of the portable computing device with the remote resources; determining an available usage time based on the estimated synchronization time and the estimated battery life; and displaying an indication of the available usage time.

As a portable computing device, one embodiment includes: a display device, a memory device, a processor, a modem and a telephone line detection circuit. The memory device stores a computer program to provide synchronization processing. The processor executes the computer program to provide the synchronization processing. The modem operates to provide communications over a telephone line when activated. The telephone line detection circuit operates to detect the existence of the connection of the modem to the telephone line. When the telephone line detection circuit detects the existence of the connection of the modem to the telephone line, the telephone line detection circuit informs the processor and in response the processor activates the synchronization processing.

The advantages of the invention are numerous. Different embodiments of the invention may yield some or all of these advantages. One advantage of the invention is that minimal power consumption is used by the portable computing device during synchronization. As a result, battery power is conserved and thus synchronization operation are less likely to fail due to battery failure. Another advantage of the invention is that the amount of user interaction that needed by the portable computing device in performing synchronization is substantially reduced.

Other aspects and advantages of the invention will become apparent from the following detailed description taken in conjunction with the accompanying drawings which illustrate, by way of example, the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

The invention relates to synchronization techniques that improve the ease with which synchronization operations are performed. Synchronization is performed between resources on a portable computing device and resources stored on a remote server. There are several aspects of the invention and embodiments of the invention can use one or more of these aspects to provide improved synchronization. One aspect of the invention pertains to providing centralized synchronization across different types so that user interaction to achieve the different types of synchronization is minimal. Another aspect of the invention pertains to conservation of battery power during synchronization. Still another aspect of the invention pertains to informing a user of the portable computing device that shut-down or low-power state should be entered within a predetermined period of time to have sufficient battery power remaining to perform the synchronization. Yet another aspect of the invention is the ability to automatically activate the synchronization processing upon detecting of the connection to a telephone line.

Embodiments of this aspect the invention are discussed below with reference to FIGS. 1–4. However, those skilled in the art will readily appreciate that the detailed description given herein with respect to these figures is for explanatory purposes as the invention extends beyond these limited embodiments.

Figure 1:
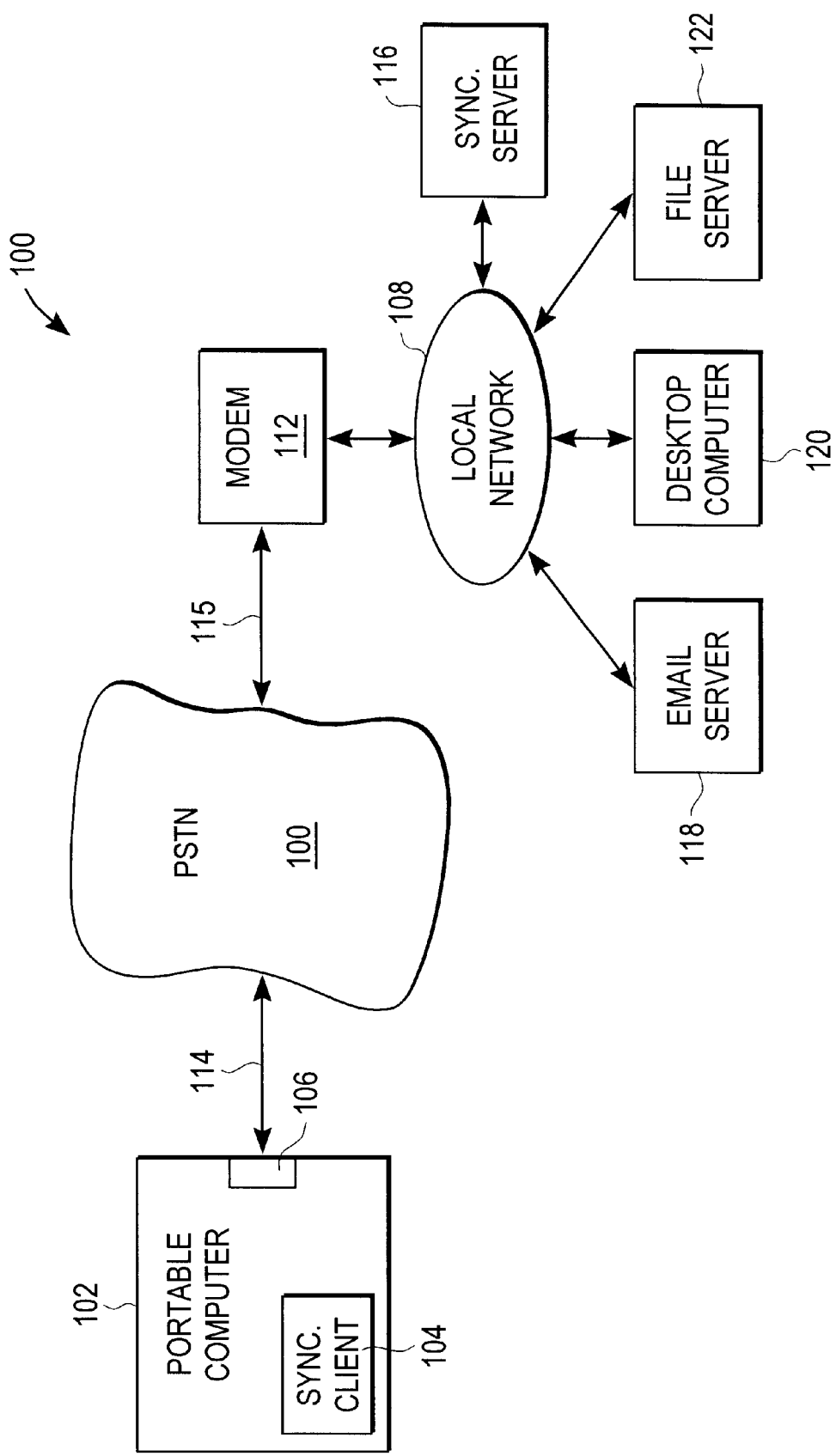
FIG. 1 illustrates a synchronization system according to an embodiment of the invention.

FIG. 1 illustrates a synchronization system 100 according to an embodiment of the invention. The synchronization system 100 operates to synchronize a portable computer 102 (e.g., laptop computer) with remotely located resources. The portable computer 102, among other things, includes a synchronization client 104 and a modem 106. The synchronization client 104 operates on the portable computer 102 to synchronize certain resources (information) resident on the portable computer 102 with the corresponding resources (information) resident on remote computers. The portable computer 102 communicates with a local network 108 using the modem 106. A communication link is formed between the modem 106 and the local network 108 to provide the communications between the modem 106 and the local network 108. The communication link includes a public service telephone network (PSTN) 110, a modem 112, and analog telephone lines 114 and 115. The local network 108 is, for example, a local area network (LAN). The local network 108 links together various application servers. An application server can refer to a computer or an application or system installed on a computer. For example, as shown in FIG. 1, the application servers can include a synchronization server 116, an email server 118, a desktop computer 120, and a file server 122. The synchronization server 116 communicates with the synchronization client 104 on the portable computer 102 to synchronize resources resident on the portable computer 102 with those corresponding resources residing on the email server 118, the desktop computer 120 and the file server 122.

According to the invention, the synchronization between the portable computer 102 and the application servers is performed or controlled by the synchronization client 104 and the synchronization server 116. The synchronization processing performed by the synchronization client 104 and the synchronization server 116 are described in greater detail below. The synchronization can occur with minimal power consumption and with minimal user effort. The portable computer 102 can also monitor battery power to budget or reserve sufficient power to perform the synchronization.

Figure 2:
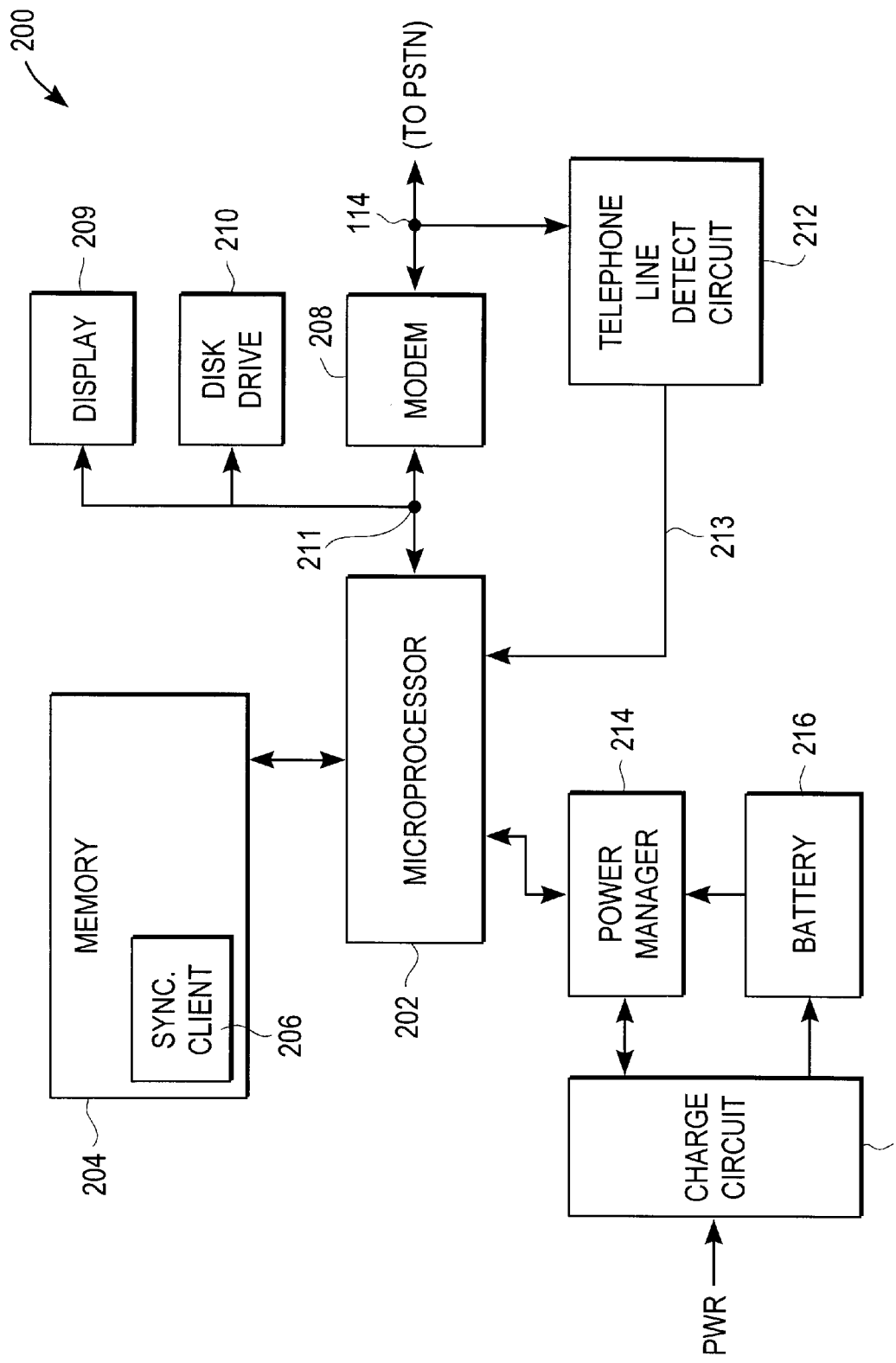
FIG. 2 is a block diagram of a portable computer according to one embodiment of the invention.

FIG. 2 is a block diagram of a portable computer 200 according to one embodiment of the invention. The portable computer 200 is, for example, the portable computer 102 illustrated in FIG. 1.

The portable computer 200 includes a microprocessor 202 that controls the overall operation of the portable computer 200. The portable computer 200 also includes a memory 204 that is coupled to the microprocessor 202. The memory 204 stores among other things a synchronization client 206. The synchronization client 206 monitors or tracks changes to resources residing on the portable computer 200 so that such resources can be synchronized with corresponding copies of the resources remotely located. The synchronization client 206 also activates the synchronization process by communicating with a synchronization server.

The portable computer 200 also includes a modem 208, a display 209 and a disk drive 210. The modem 208, the display 209 and the disk drive 210 are coupled to the microprocessor 202 through a peripheral bus 211. The modem 208 couples the portable computer 200 to the PSTN via the analog line 114, when the analog line 114 coupled to the PSTN is connected to the modem 208. The disk drive 210 can store a variety of data or programs for use by the portable computer 200. With respect to the synchronization client 206, the disk drive 210 typically provides permanent storage for the synchronization client 206 and then at least a portion thereof is loaded into the memory 204. When the synchronization client 206 (or at least a portion) is resident in the memory 204, then the synchronization client 204 is operable without the need for activating the disk drive 210. Also, as discussed below, the display 209 need not be activated during the synchronization. Hence, by not powering the disk drive 210 or the display 209, the portable computer 200 is able to beneficially reduce the amount of power it needs to consume during the synchronization process.

In this embodiment, a telephone line detect circuit 212 is also coupled to the modem 208 or the analog line 114 (when present) such that the existence of the analog line 114 can be detected. As an example, the telephone line detect circuit 212 can detect the existence of the analog line 114 (telephone line) by monitoring the voltage on a modem connector for the analog line 114. Once the telephone line detect circuit 212 detects the presence of the analog line 114, a line detection signal 213 can be forwarded to the microprocessor 202. In response to the line detection signal 213, the microprocessor 202 can activate the synchronization client 206 so that the synchronization processing can be performed. With the telephone line detect circuit 212, the portable computer 200 is able to begin a synchronization process without user initiation because the synchronization process automatically begins when the portable computer 200 is coupled to the analog line 114. In an alternative embodiment, the telephone line detect circuit 212 is not utilized and instead a button can be provided on an exterior surface of the portable computer 200 and when the synchronization process is to begin, a user depresses the button to signal the portable computer 200 to begin its synchronization processing.

The portable computer 200 also includes a power manager 214, a battery 216 and a charge circuit 218. The power manager 214 is coupled to the microprocessor 202 to inform the microprocessor 202 of the power situation for the portable computer 200. The power situation, for example, includes feedback concerning the amount of stored charge (energy) remaining in the battery 216, whether or not the charge circuit 218 is charging the battery 216, and whether or not power is supplied to the charge circuit 218 through a power cord coupled to an power (e.g., AC) outlet.

Figure 3A:
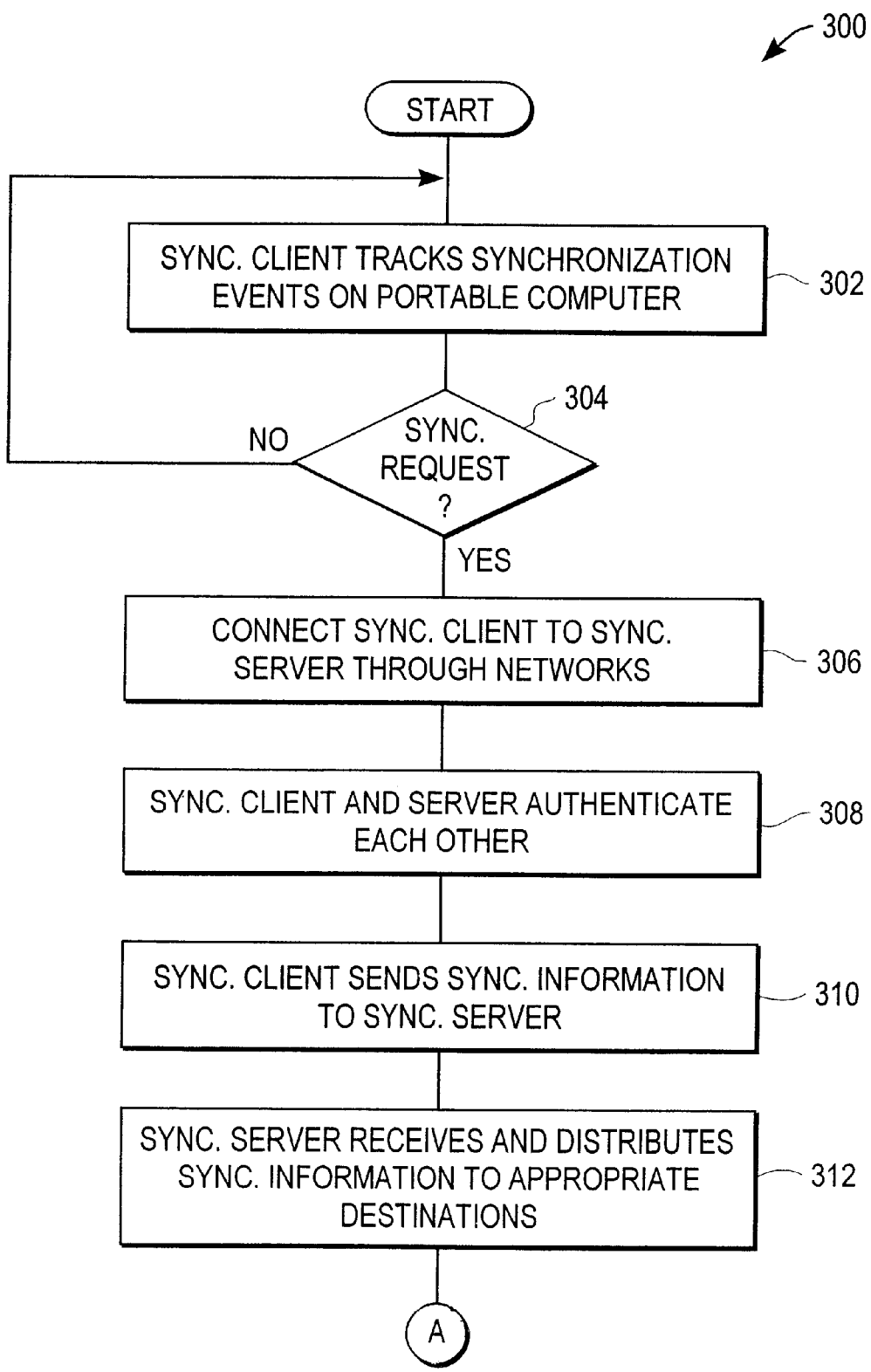
FIGS. 3A and 3B are flow diagrams of synchronization processing according to one embodiment of the invention.
Figure 3B:
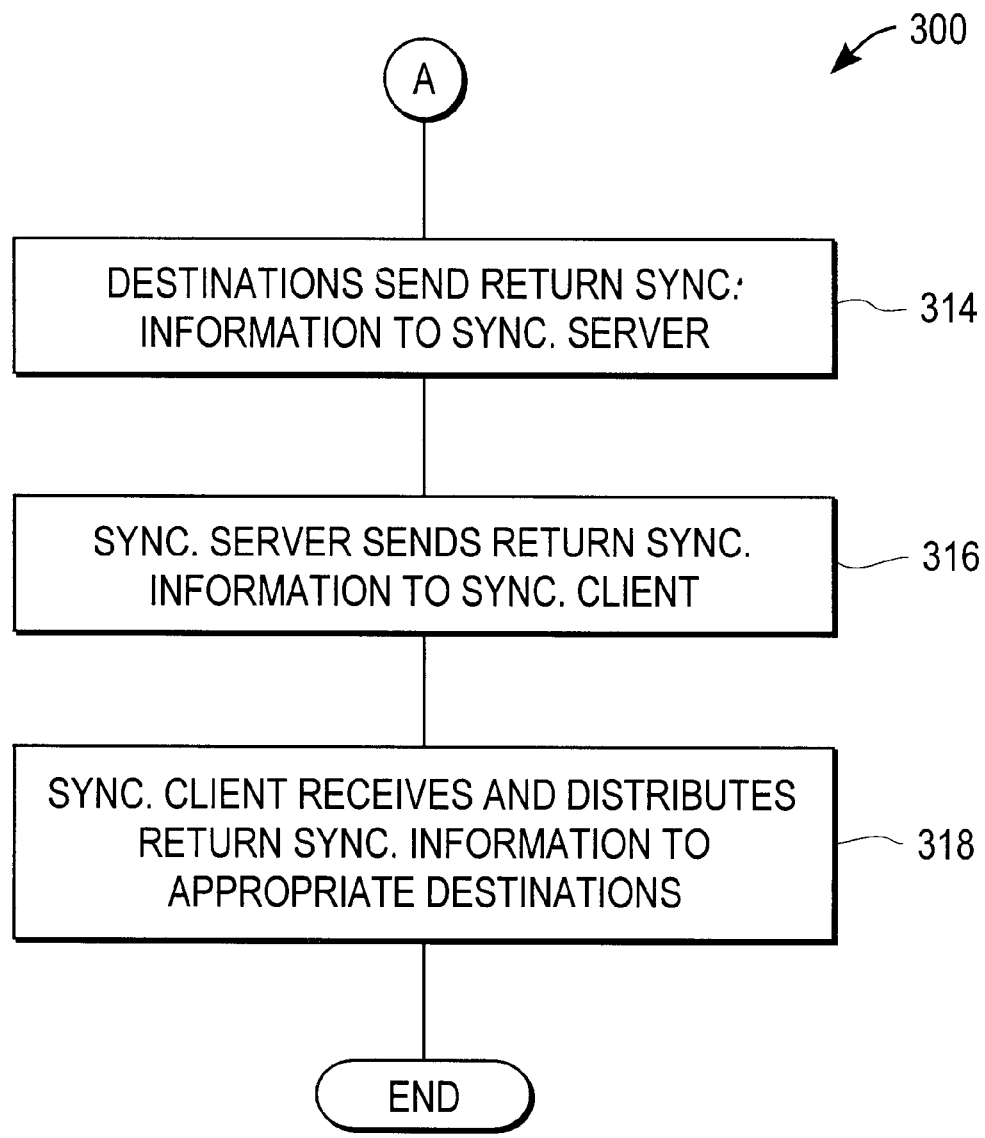

FIGS. 3A and 3B are flow diagrams of synchronization processing 300 according to one embodiment of the invention. The synchronization processing 300 synchronizes resources resident on a portable computer with corresponding resources located on one or more remote servers (computers, or systems or applications running on computers). The synchronization processing 300 is, for example, performed by a synchronization client and a synchronization server, such as the synchronization client 104 and the synchronization server 116 illustrated in FIG. 1.

The synchronization processing 300 begins with the synchronization client tracking synchronization events on the portable computer in block 302. The tracking of the synchronization events typically occurs in the background while the portable computer is otherwise performing processing requested by the user. For example, if a file of interest is created or modified since a last update occurred, then the synchronization client logs an indication that the file needs to be synchronized.

While the synchronization client is tracking the synchronization events, a decision is made based on whether a synchronization request has been received at block 304. The synchronization request can be initiated in a variety of ways, such as by a user depressing a button or by automatic detection of the coupling of the portable computer to a telephone line. Normally, a user would place the portable computer into a synchronization mode (which also has a low power state) and then the portable computer would await a synchronization request indicating that synchronization can now be performed. When it is determined that a synchronization request has not been received, then the synchronization processing 300 returns to repeat the block 302 and subsequent blocks where tracking of synchronization events continues. On the other hand, when the synchronization request has been received, then the synchronization between the portable computer and the remote server occurs.

The performance of the synchronization between the portable computer and the remote server is as follows.

Initially, the synchronization client is connected to the synchronization server through networks at block 306. Next, at block 308, the synchronization client and the synchronization server authenticate each other. After authentication occurs, the synchronization client sends synchronization information to the synchronization server at block 310. The synchronization server then receives (and perhaps acknowledges) the synchronization information that has been provided by the synchronization client at block 312. The synchronization information specifies the resources (e.g., files) that are to be updated and where they reside. The synchronization information can also indicate creation or modification dates for the resources. Additionally, in block 312, the synchronization server distributes the synchronization information to the appropriate destinations. Typically, the synchronization server is coupled to a local network that also couples to one or more destinations for the synchronization information. Examples of the destinations include an email server, a desktop computer, and a file server.

The sending, receiving and distribution of the synchronization information is further explained by the following examples. In one embodiment, if during the tracking of synchronization events by the synchronization client, the synchronization client recognizes a new email message at the portable computer then, when synchronization information is sent pertaining to that new email to the synchronization server, the synchronization server operates to distribute the new email message to the email server as being the appropriate destination for such information. In another example, a desktop folder present on a desktop area associated with the portable computer can also be tracked for synchronization events. If a file has been updated that is stored within the desktop folder on the portable computer, the synchronization client can include synchronization information that is sent to the server to inform the synchronization server of the update status of that file. The synchronization server then forwards the update information pertaining to the file to the desktop computer which contains a like folder on its desktop or elsewhere. In still another example, a file resident on the portable computer might be updated and the synchronization information might inform the synchronization server of its update. Then, the synchronization server forwards the synchronization information to the file server so that the file server file can be similarly updated.

After block 312, the synchronization between the portable computer and the destinations has occurred with respect to changes that have occurred on the portable computer. The destination operate to complete the synchronization, often using their built-in synchronization features. For example, an email server understands how to receive a new email message from the portable computer. As another example, synchronization between particular folders on portable and desktop computers is known. Still another example, file servers know how to synchronize files to utilize a most recent version.

Synchronization can also occur in the opposite direction due to changes that have been tracked on the destinations that need to be made available to the portable computer. Hence, the synchronization processing 300 can further operate to send return synchronization information from the destinations to the synchronization server in block 314. Then, at block 316, the synchronization server sends the return synchronization information to the synchronization client at the portable computer. Thereafter, the synchronization client receives and distributes the return synchronization information to the appropriate destinations within the portable computer at block 318. Following block 318, the synchronization processing 300 is complete and ends.

Figure 4:
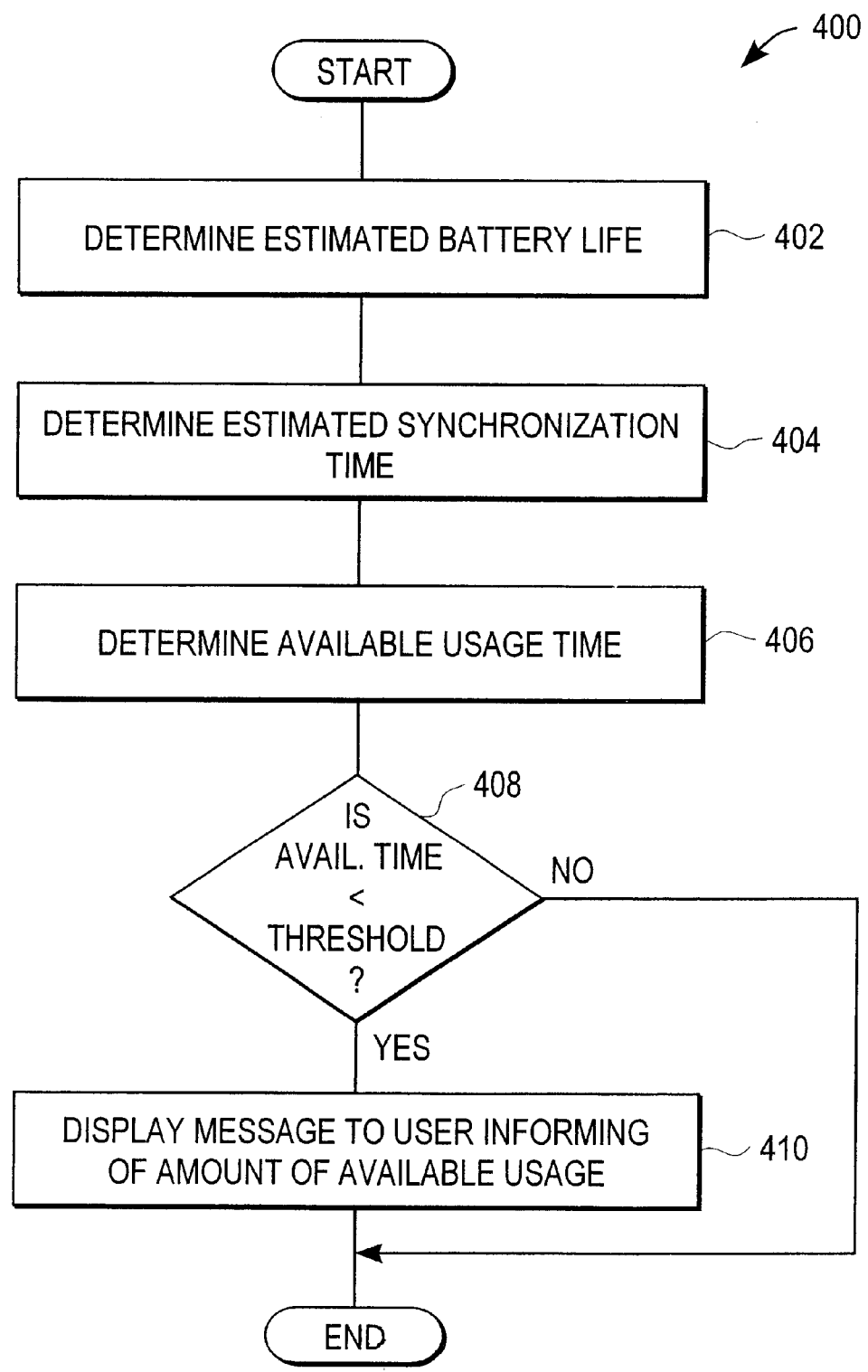
FIG. 4 is a flow diagram of power notification processing according to an embodiment of the invention.

FIG. 4 is a flow diagram of power notification processing 400 according to an embodiment of the invention. The power notification processing 400 is, for example, performed by the power manager 214 illustrated in FIG. 2. Alternatively, the power notification processing 400 can be performed by the microprocessor 202 illustrated in FIG. 2.

The power notification processing 400 begins by determining an estimated battery life for a battery used to power the portable computer in block 402. The estimated battery life can be determined by examining the amount of charge remaining in the battery that powers the portable computer given an estimated consumption rate by the portable computer. Next, at block 404, an estimated synchronization time is determined. The estimated synchronization time is the estimated amount of time that is required for the personal computer to synchronization with the remote server. The estimation of the synchronization time can be performed in a variety of ways. For example, the estimated synchronization time can be the average synchronization time based on the examination of time durations associated with prior synchronizations. Alternatively, the estimated synchronization time can be determined in accordance in accordance with modem speed and amount of data to be transferred during the synchronization.

Following block 404, an available usage time is determined. The available usage time is the amount of time that is available for the user to continue utilizing the portable computer before shutdown should be made so that synchronization can be performed using the remaining battery power. In one embodiment, the available usage time can be determined by subtracting the estimated synchronization time from the estimate battery life. For example, if the estimated battery life is ten (10) minutes and the estimated synchronization time is three (3) minutes, then the available time would be seven (7) minutes.

At block 408, the available usage time is compared with a threshold amount. When the available usage time is determined to be less than the threshold value, a message is displayed to the user in block 410 to inform the user of the amount of available usage time. Hence, the message displayed to the user can inform the user that the user should shut down shortly (not longer than the amount of available time) to allow sufficient battery power to perform synchronization processing. For example, if the available usage time was determined to be seven (7) minutes and the threshold value was fifteen (15) minutes, then the message displayed to the user could inform the user to shut down the portable computer within the next seven (7) minutes if battery-powered synchronization is desired. The message could also further indicate that, in any case, the battery can power the portable computer for at most only a certain number of minutes as determined by the estimated battery life (e.g., 10 minutes) if battery-powered synchronization is not desired. Alternatively, when the available time is determined to exceed the threshold value, then the block 410 is bypassed and no message need be displayed to the user because the amount of available time is deemed significant. However, in either case, conventional battery charge indications can generally still be provided to the user of the portable computer, such as by displaying a battery gauge on a display of the portable computer.

Following block 410, as well as following the decision block 408 when the available usage time does not exceed the threshold amount, the power notification processing 400 is complete and ends. The message displayed at block 410 can be removed from the display of the potable computer by user action or automatically after a predetermined period of time.

The invention employs various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations. An exemplary structure for the invention is described below.

The invention can also be embodied as computer readable code on a computer readable medium. The computer readable medium is any data storage device that can store data which can be thereafter be read by a computer system. Examples of the computer readable medium include read-only memory, random-access memory, CD-ROMs, magnetic tape, optical data storage devices. The computer readable medium can also be distributed over a network coupled computer systems so that the computer readable code is stored and executed in a distributed fashion.

The advantages of the invention are numerous. Different embodiments of the invention may yield some or all of these advantages. One advantage of the invention is that minimal power consumption is used by the portable computing device during synchronization. As a result, battery power is conserved and thus synchronization operation are less likely to fail due to battery failure. Another advantage of the invention is that the amount of user interaction that needed by the portable computing device in performing synchronization is substantially reduced.

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A method for synchronizing resources between a portable computing device and a remote synchronization server, said method comprising:

centrally tracking synchronization events on the portable computing device, the synchronization events pertaining to multiple applications;

determining whether synchronization is to be performed; and a telephone line detection circuit within said portable computing device, said telephone line detection circuit detects with a telephone line is coupled to said portable computing device, and the synchronization request is automatically caused by said telephone line detection circuit, when said determining indicates that synchronization is to be performed, then respectively sending synchronization information pertaining to the synchronization events tracked to the remote synchronization server, and thereafter distributing the synchronization information to appropriate destination application servers where synchronization operations are separately performed, the destination application servers being associated with the multiple applications.

2. A method as recited in claim 1, wherein the destination application servers are coupled to the synchronization server.

3. A method as recited in claim 1, wherein said sending of the synchronization information from the portable computing device and the synchronization server is performed at least in part over a telephone line connection.

4. A method as recited in claim 1, wherein when said determining (b) indicates that synchronization is to be performed, performing the additional operations of connecting the portable computing device to the synchronization server, and authenticating the portable computer by the synchronization server.

5. A method as recited in claim 4, wherein the connection of the portable computer to the synchronization is performed at least in part over a telephone line connection.

6. A method as recited in claim 2, wherein at least one of the destination application servers is one of a file server and an email server.

7. A method as recited in claim 1, wherein the portable computing device is a portable computer.

8. A method as recited in claim 1, wherein the portable computing device includes a battery to provide battery-power to the portable computing device, and wherein said method further comprises:

estimating an estimated synchronization time needed to perform at least said sending of the synchronization information;

monitoring available battery-power of the battery; and providing a warning to the user of the portable computing device before the available battery-power is less than an amount of power needed to power the remote computing device for the estimated synchronization time.

9. A method as recited in claim 1, wherein said method further comprises:

performing the synchronization operations in accordance with the synchronization information; and acknowledging to the portable computing device that the synchronizations have been performed.

10. A method as recited in claim 9, wherein the portable computing device includes a battery to provide battery-power to the portable computing device, and wherein said method further comprises:

estimating an estimated synchronization time needed to perform at least said sending of the synchronization information;

monitoring available battery-power of the battery; and providing a warning to the user of the portable computing device before the available battery-power is less than an amount of power needed to power the remote computing device for the estimated synchronization time.

11. A method as recited in claim 10, wherein said estimating of the estimated synchronization time includes the time needed for at least said sending of the synchronization, said performing the synchronization operations, and said acknowledging to the portable computing device that the synchronizations have been performed.

12. A system for synchronization of a portable computing device with remotely located resources, said system comprising:
   local resources stored on the portable computing device;
   a synchronization client on the portable computing device that logs changes to said local resources;
   a remote destination server that stores remote resources, at least a portion of said local resources being copies of said remote resources;
   a synchronization server that communicates with said synchronization client to synchronize those of said remote resources that correspond to said local resources that have been logged as being changed by said synchronization client, wherein the synchronization is initiated by said synchronization client when a synchronization request is received;
   a plurality of remote destination servers that each store remote resources, at least a portion of the local resources on each of said remote destination servers are copies of said remote resources; and
   a telephone line detection circuit within said portable computing device, said telephone line detection circuit detects with a telephone line is coupled to said portable computing device,
   wherein the synchronization request is automatically caused by said telephone line detection circuit.

13. A system as recited in claim 12, wherein said remote destination servers are application programs and their associated files.

14. A system as recited in claim 12, wherein at least one of said remote destination servers is a desktop computer.

15. A system as recited in claim 12, wherein said remote destination servers are on different computer machines coupled together via a local network.

16. A system as recited in claim 12, wherein at least one of said remote destination servers is an email server.

17. A system as recited in claim 12, wherein at least one of said remote destination servers is a file server.

18. A system as recited in claim 12, wherein said synchronization server distributes those of said local resources that have been logged as being changed by said synchronization client to the appropriate one of said remote destination servers that stores the remote resource that corresponds thereto.

19. A system as recited in claim 12, wherein said system further comprises:
   a power monitoring unit within said portable computing device, said portable computing device monitors available battery power from a battery used to power said portable computing device; and
   a warning message unit within said portable computing device, said warning message unit operates to display a warning message on a display device of said portable computing device to inform a user that continued use of the portable computing device beyond a predetermined amount of time will impair the ability for the synchronization to occur under battery power.

20. A system as recited in claim 12, wherein at least after the synchronization request is caused the synchronization can be performed without user interaction with the portable computing device.

21. A system as recited in claim 12, wherein the portable computing device has a display device, and wherein at least after the synchronization request is caused the synchronization can be performed without user interaction with the portable computing device and without powering the display device.

22. A system as recited in claim 21, wherein the portable computing device has a housing that folds open to facilitate user interaction with the display device, and wherein the synchronization can be performed with the housing folded closed.

23. A system as recited in claim 12, wherein while waiting for the synchronization request and when no user interaction is present, the portable computing device enters a low power state.

24. A method for notifying a user of a portable computing device that shut-down should occur to permit synchronization of the portable computing device with remote resources, the portable computing device including a battery, said method comprises:
   determining an estimated battery life for the battery when continuing to power the portable computing device from the battery;
   determining an estimated synchronization time for synchronization of the portable computing device with the remote resources;
   determining an available usage time based on the estimated synchronization time and the estimated battery life; and
   displaying an indication of the available usage time.

25. A method as recited in claim 24,
   wherein said method further comprises comparing the available usage time with a predetermined threshold, and
   wherein said displaying of the indication of the available usage time is performed only when the available usage time is less than the predetermined threshold.

26. A method as recited in claim 24,
   wherein the portable computing device includes a display device, and
   wherein the indication is a warning message that is displayed on the display device.

27. A portable computing device, comprising:
   a display device;
   a memory device, said memory device stores a computer program to provide synchronization processing;
   a processor for executing the computer program to provide the synchronization processing;
   a modem, said modem operates to provide communications over a telephone line when activated; and
   a telephone line detection circuit operatively connected to said modem and said processor, said telephone line detection circuit operates to detect the existence of the connection of said modem to the telephone line,
   wherein when said telephone line detection circuit detects the existence of the connection of said modem to the telephone line, said telephone line detection circuit informs said processor and in response said processor activates the synchronization processing.

28. A portable computing device as recited in claim 27, wherein said memory device stores local resources stored on the portable computing device, and
   wherein the computer program to provide synchronization processing a synchronization client on the portable computing device that logs changes to the local resources.

29. A portable computing device as recited in claim 27, wherein said portable computing device is a laptop computer.

30. A method for synchronizing resources between a portable computing device and a remote synchronization server, the remote synchronization server having at least a first application server and a second application server coupled thereto, wherein the portable computing device including a battery to provide battery-power to the portable computing device, said method comprising:

centrally tracking synchronization events on the portable computing device, the synchronization events pertaining to multiple applications;

determining whether synchronization is to be performed;

estimating synchronization time needed to perform at least said sending of the first and second synchronization information;

monitoring available battery-power of the battery; and providing a warning to the user of the portable computing device before the available battery-power is less than an amount of power needed to power the remote computing device for the estimated synchronization time, when said determining indicates that synchronization is to be performed, then producing first and second synchronization information pertaining to the synchronization events tracked and sending the first and second synchronization information to the remote synchronization server, and thereafter distributing the first synchronization information to the first application server where synchronization operations are performed therefor and distributing the second synchronization information to the second application server where synchronization operations are performed therefor.

31. A method as recited in claim 30, wherein when said determining indicates that synchronization is to be performed, performing the additional operations of connecting the portable computing device to the synchronization server, and authenticating the portable computing device by the synchronization server.

32. A method as recited in claim 30, wherein each of the first and second application servers is one of a file server, an email server and a desktop computer.

33. A method as recited in claim 30, wherein the portable computing device is a portable computer.

34. A method as recited in claim 30, wherein said method further comprises:

performing the synchronization operations in accordance with the first and second synchronization in formation; and acknowledging to the portable computing device that the synchronizations have been performed.

35. A method as recited in claim 30, wherein said estimating of the synchronization time includes the time needed for at least said sending of the first and second synchronization information, said performing of the synchronization operations, and said acknowledging to the portable computing device that the synchronizations have been performed.

36. A system for synchronization of a portable computing device with remotely located resources, said system comprising:

local resources stored on the portable computing device;

a synchronization client on the portable computing device that logs changes to said local resources;

a remote destination server that stores remote resources, at least a portion of said local resources being copies of said remote resources;

a synchronization server that communicates with said synchronization client to synchronize those of said remote resources that correspond to said local resources that have been logged as being changed by said synchronization client;

a plurality of remote destination servers that each store remote resources, at least a portion of the local resources on each of said remote destination servers are copies of said remote resources;

a power monitoring unit within said portable computing device, said portable computing device monitors available battery power from a battery used to power said portable computing device; and a warning message unit within said portable computing device, said warning message unit operates to display a warning message on a display device of said portable computing device to inform a user that continued use of the portable computing device beyond a predetermined amount of time will impair the ability for the synchronization to occur under battery power.

* * * * *